United States Patent [19]

Moos et al.

[11] 4,284,032

[45] Aug. 18, 1981

[54] PNEUMATIC CONVEYOR OF ADJUSTABLE CONVEYANCE CAPACITY FOR POWDERED TO GRANULAR BULK MATERIAL

[75] Inventors: Kurt Moos, Wil; Karl Buschor, St. Gall, both of Sweden

[73] Assignee: Gema AG, Switzerland

[21] Appl. No.: 93,637

[22] Filed: Nov. 13, 1979

[30] Foreign Application Priority Data

Nov. 14, 1978 [DE] Fed. Rep. of Germany ....... 2849295

[51] Int. Cl.³ .............................................. B65G 53/66
[52] U.S. Cl. ..................................... 118/684; 73/199; 118/308; 137/486; 239/61; 406/14; 406/31; 406/144; 406/192
[58] Field of Search ....................... 406/14, 15, 19, 30, 406/31, 144, 192, 194; 239/61, 67; 118/684, 685, 688, 689, 692, 308; 137/487.5, 486; 73/199

[56] References Cited

U.S. PATENT DOCUMENTS

| | | | |
|---|---|---|---|
| 2,771,323 | 11/1956 | Taylor | 406/14 |
| 3,163,329 | 12/1964 | Mornas | 406/30 X |
| 3,365,242 | 1/1968 | Marchetti | 406/14 |
| 3,504,945 | 4/1970 | Leibundgut et al. | 406/144 |

FOREIGN PATENT DOCUMENTS 641178  8/1950  United Kingdom ...................... 406/14

*Primary Examiner*—Jeffrey V. Nase
*Attorney, Agent, or Firm*—Ostrolenk, Faber, Gerb & Soffen

[57] ABSTRACT

A pneumatic conveyor for powdered to granular bulk material, having adjustable conveyance capacity, is disclosed, the capacity being adjusted by electromagnetic adjustment of a pressure regulator disposed in a conduit used to supply a propellant for drawing the bulk material from a storage container thereof and for conveying it. A supplemental supply of gas, which may be but need not be different from the propellant gas, may be provided to control the flow of propellant gas independently of the first pressure regulator. In this case, the flow of the supplemental gas may itself be controlled by a second pressure regulator. The pressure regulators operate according to the diffuser or Venturi principle. The device may be particularly advantageously applied to the spray-coating of articles with a bulk material.

27 Claims, 3 Drawing Figures

PNEUMATIC CONVEYOR OF ADJUSTABLE CONVEYANCE CAPACITY FOR POWDERED TO GRANULAR BULK MATERIAL

BACKGROUND OF THE INVENTION

This invention relates to a pneumatic conveyor of adjustable conveyance capacity for powdered to granular bulk material, particularly for the spray-coating of articles, in which the bulk material is drawn from a storage container by a stream of propellant gas in a pneumatic conveyor and is blown into a conveyor conduit, and in which a pressure regulator is contained in the propellant-gas conduit.

The invention further relates to a pneumatic conveyor system of adjustable conveyance capacity for powdered to granular bulk material, particularly for the spray-coating of articles, in which the material is drawn from the storage container by a stream of propellant gas in a diffuser of a pneumatic conveyor and is blown into a conveyor conduit and in which furthermore a conduit for control gas discharges into the vacuum region of the diffuser so that by the feeding of control gas the vacuum in this region and thereby the conveyor output can be varied, and in which a device for adjusting the feed of control gas is contained in the control-gas conduit.

The invention also relates to a pressure regulator which is particularly suitable for pneumatic conveyor devices for the spray coating of articles.

A pneumatic conveyor device of this type and a pneumatic conveyor apparatus for it, the latter being also referred to as injector or diffuser, are knwon from German Pat. No. 1,266,685.

A spray device for the spray coating of articles to which bulk material can be fed by a pneumatic conveyor system of the type indicated is known from Swiss Pat. No. 429,517.

Furthermore from German Unexamined Application for Pat. No. 26 02 844 a pressure regulator is known. However, this regulator cannot be operated remotely. Furthermore due to leakage losses and inaccuracies it is not suitable for the regulating of gas. Therefore it was necessary up to now in the known pneumatic conveyor systems to use, in addition to a pressure reducer also a separate solenoid valve (on-off valve) as well as a pressure gauge. The pressure gauge indicates the pressure value which is to be set on the pressure reducer. Only after this adjustment has been effected is the solenoid valve opened.

Spray coating with known pneumatic conveyor systems has the following disadvantages:

1. The articles which are to be coated in the spray process frequently require a thicker coating in one region than in another region. Since automatic adjustment is not possible with the known systems, coating has heretofore been effected with an average thickness of coating, i.e. in part too thick and in part too thin. Periods of stay of different length of the articles in front of the spray device are not possible since the articles are passed continuously by the transport device through the dryer. If the transport device is allowed to operate intermittently, undesired other disadvantages can result therefrom.
2. If several articles are to be coated one after the other, a large amount of time is necessary for adjustment of the new pressure and conveyance values.
3. Undesired changes in the stream of material conveyed are only noted after the articles in question have already been coated, this resulting in rejects.
4. The known devices deliver the conveyed bulk material continuously. The bulk material which is delivered between the articles to be coated must be drawn off by expensive devices of high suction power, cleaned and returned in metered quantity to the storage container for the bulk material.
5. The gases—normally air—necessary for the transport and adjustment of the quantity of bulk material conveyed are subject to pressure variations which have a detrimental effect, particularly in the form of too thin a coating of the articles, which leads to rejects or to the necessity of recoating, or else in the form of excessively thick coatings which means the use of an unnecessary amount of material and increased expense.

SUMMARY OF THE INVENTION

The object of the present invention is to provide a more advantageous manner of operation and greater ease in handling.

This object is achieved in accordance with the invention by providing the pressure regulator for the conveyor-gas conduit and/or the pressure regulator for the control-gas conduit with an electromagnet which, depending on the value of an electric signal applied thereto establishes a given desired value of pressure which is to be maintained by the pressure regulator. The electromagnet is connected to an electric signal transmitting device.

The setting of the pressure regulator can extend from a value of zero up to a maximum value. At one of these two extreme values, the pressure regulator completely closes the passage between inlet and outlet. The value of the electric signal to be fed to the electromagnet of the pressure regulator can also extend from a value of zero up to a given maximum value. This means that in the case of an electrical signal of a value of zero no voltage is applied to the electromagnet. In this condition the electromagnet is not energized and the main valve of the pressure regulator is preferably closed.

By the present invention it is possible to program the conveyance output. The electromagnet can be connected to a program transmitter which feeds it, in given time sequence, certain electric desired-value signals. Simultaneously or alternately with this it is possible to measure the stream of gas and material conveyed and as a function thereof to feed corresponding signals to the electromagnet of the pressure regulator, for instance to change the flow of gas in the event of an undesired change in the flow of material or shut it off completely. It is furthermore possible to feed the electromagnet signals which indicate to it whether an article which is to receive the stream of material is present and therefore for instance whether an article to be coated is or is not present in front of a spray gun. In this way it is possible, for instance, to interrupt the delivery of bulk material between the individual articles to be coated. Furthermore, by the said program transmitter the electromagnet can be set in such a manner that the stream of gas is adjusted to a different value. In this way the quantity of bulk material conveyed is changed accordingly and thus also the thickness of coating applied to an article.

The stream of gas can be influenced both by changing the stream of propellant gas and by a change in the stream of control gas. Both conduits of these streams of gas discharge into the pneumatic conveyor.

A pressure regulator which is suitable for the determining of the stream of propellant gas and/or the stream of control gas can have a main valve arranged between an inlet for the gas and an outlet for the gas, the valve body of said valve closing the valve seat or opening it to different extents depending on the control condition and furthermore provided with a control pressure space the pressure of which acts on the main valve body and which is connected on the one hand via a choke with the input and on the other hand via a control valve with a vent space (possibly the surrounding atmosphere), and said pressure regulator may furthermore contain a pressure setting device which urges the valve body of the control valve more or less strongly into closed position against the pressure prevailing in the control pressure space by a force which is dependent on the pressure set, and a device for detecting and feeding back the actual value of the pressure prevailing in the outlet.

Such a pressure regulator is characterized in accordance with the invention by the fact that the said electromagnet is a part of the pressure setting device and that a feed-back pressure space is provided the pressure of which acts on the main valve body against the pressure present in the control pressure space and which is connected on the one hand via a choke with the output and on the other hand via an adjustable choke with a vent space (possibly the surrounding atmosphere).

One gas which is cheap and frequently used is air.

The regulator of the invention regulates so precisely that practically no noticeable pressure variations occur any longer. By the two chokes of the feed-back pressure space there is formed a so-called pressure divider by which the regulations no longer take place statically but rather dynamically. In this way practically the same pressure can be obtained at the outlet as at the inlet. Furthermore, by the adjustable chokes tolerances resulting from manufacture can be compensated for so that when a desired pressure is set no pressure gauge is required any longer since every value of voltage applied to the electromagnet of the pressure regulator corresponds to a very specific gas pressure. The control deviations of the pressure regulator are less than ±1%.

Further features of the invention will become clear from the following description and the Claims.

BRIEF DESCRIPTION OF THE INVENTION

Various embodiments of the invention are described by way of example below with reference to the drawings, in which:

FIG. 1 is a sectional view through a pressure regulator of the conveyor device of the invention, FIG. 2 shows a portion of a second embodiment of the regulator of FIG. 1 with indication of the forces and pressures acting in the pressure regulator, and FIG. 3 is a diagrammatic view of the conveyor device of the invention in use as a spray coating plant.

DETAILED DESCRIPTION OF THE INVENTION

Figure 1:
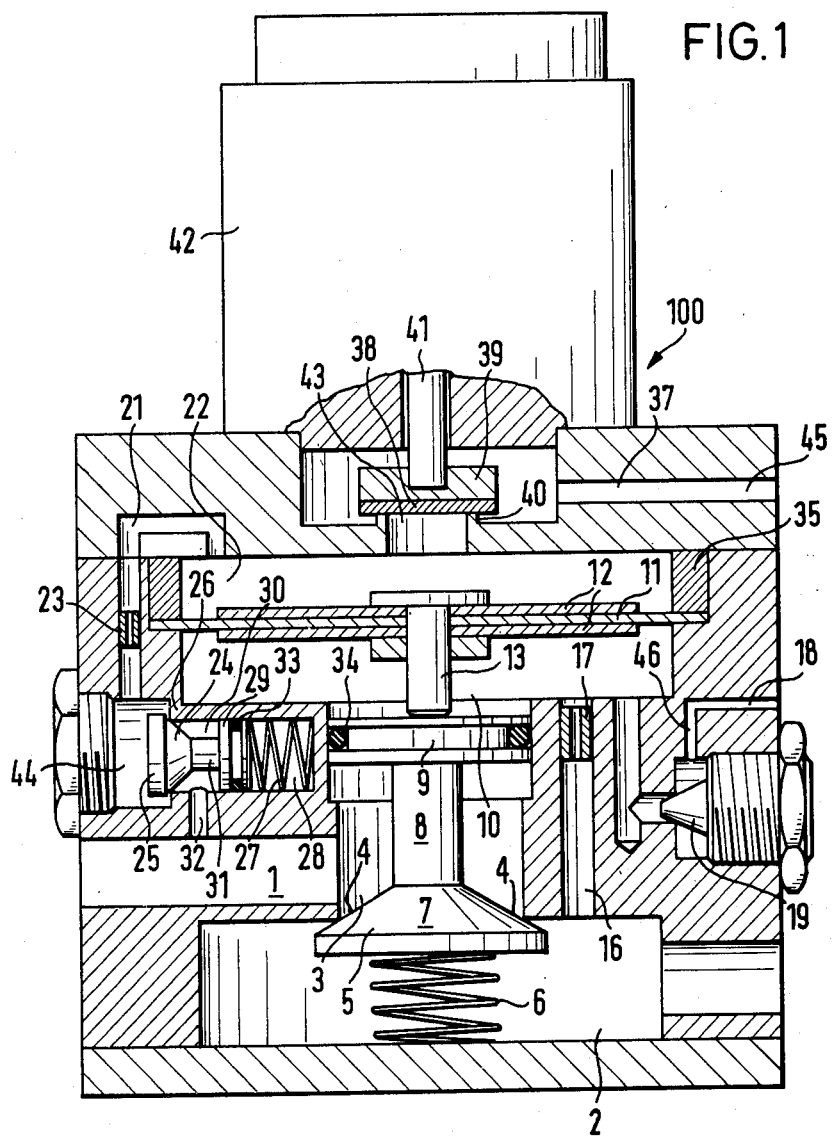
Figure 2:
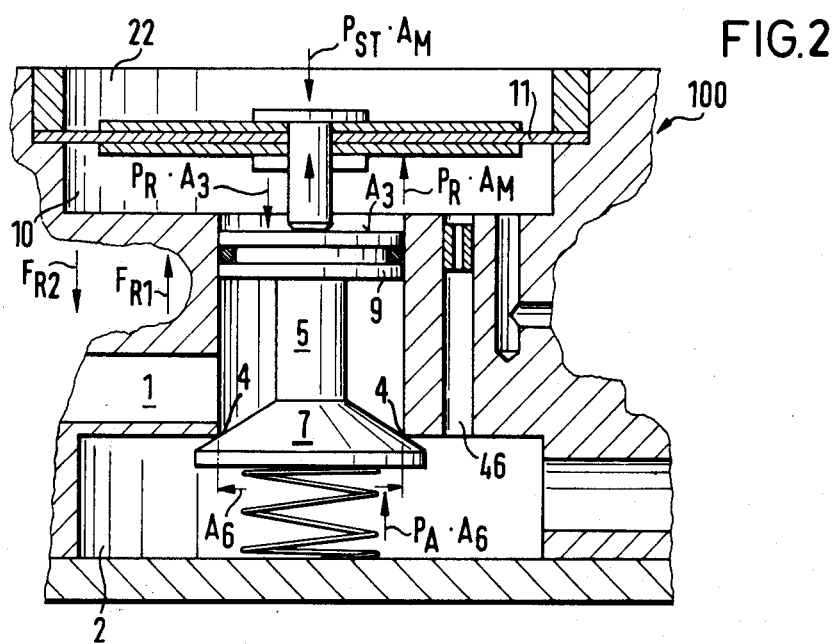

The pressure regulator 100 as shown in FIGS. 1 and 2 contains an inlet 1 and an outlet 2. Between the inlet 1 and outlet 2 there is a cylinder 3 which is a part of the inlet 1 and which is acted on in each case by the pressure in the inlet 1. The hollow interior of the cylinder 3 discharges via a valve seat 4 into the outlet 2. A main valve body 5 which can be applied against the main valve seat 4 from the side of the outlet 2 is urged into the closed position by a compression spring 6 arranged in the outlet 2. The conical valve closure element 7 of the main valve body 5 is connected via a cylindrical connecting piece 8 of smaller cross section with a piston 9 which is guided in the cylinder 3 between the closed and the fully open positions. On the side of the piston 9 facing away from the pressure of the inlet 1 there is a feed-back pressure space 10 which preferably has a larger cross section than the piston 9 and which is closed at the side opposite piston 9 by a diaphragm 11 which is correspondingly larger than the piston 9. The diaphragm 11 is reinforced by a plate 12 and its center is affixed to one end of a push rod 13 whose other end rests against the piston 9 from the side of the feed-back pressure space 10. The feed-back pressure space 10 is connected with the outlet 2 via a conduit 16 in which there is a fixed choke 17. Furthermore, the feed-back pressure space 10 is connected with a vent space by a vent conduit 18 in which an adjustable choke 19 is contained. When the fluid to be controlled is air, the vent space may be the surrounding atmosphere, as is shown in FIG. 1.

The inlet 1 is connected with a control pressure space 22 by a control pressure conduit 21. The control pressure space 22 is located on the side of the diaphragm 11 facing away from the feed-back pressure space 10 and has, preferably but not necessarily, the same cross section as the feed-back pressure space 10. A flow choke 23 is contained within the control pressure conduit 21. A regulating valve for the preregulating of the control pressure (i.e. the pressure in the control pressure space 22) is furthermore contained in the control pressure conduit 21 between the choke 23 and the inlet 1. The control pre-pressure regulating valve contains a valve body 24 which can be urged from the downstream side against a valve seat 26. A compression spring 27 urges it into open position. The space 28 which contains the spring 27 is connected with the atmosphere. The spring 27 presses against a piston 29 which is guided in a cylindrical bore 30. Through the cylindrical bore 30 there extends a cylindrical connecting piece 31 which connects the piston 29 with the conical valve closure element 25; connecting piece 31 having a smaller cross-section than piston 29 of closure element 25. A borehole 32, which forms the start of the control pressure conduit 21, connects the inlet 1 to the cylindrical space 30. The cross section of the piston 29 which is acted on by the inlet pressure and is controlling for the displacement of the valve body 24 can be larger than that of the valve closure element 5.

The pistons 29 and 9 of the two valve bodies 24 and 5 can be sealed against the cylindrical walls which receive the pistons by O-rings 33 and 34 respectively.

A ring 35 holds the diaphragm 11 in place and seals the pressure control space 22 off from the feed-back pressure space 10. The control pressure space 22 is connected via a vent conduit 37 with a vent space, which may be the surrounding atmosphere when air is used as fluid. A control valve 38 is contained in the vent conduit 37. Its valve body 39 rests on a valve seat 40. The valve-seat borehole 43 has a smaller cross section than the area of the diaphragm 11 acted on by the pressure in the control pressure space 22. The valve body 39 lies against the valve seat 40 on the side of said valve seat 40 which faces away from the control pressure space 22. The valve body 39 cooperates with the armature rod 41 of an electromagnet 42 which serves as desired-value transmitter. The armature rod 41 exerts a greater or lesser force on the valve body 39 depending on the current intensity applied to electromagnet 42, which is adjusted to represent a selected value of the control pressure it is desired to maintain in control pressure space 22. The electromagnet 42 is preferably a proportional magnet. The valve body 39 can be under the initial tension of a spring which urges it into closed position. This spring has not been shown in the drawing and can be contained within the electromagnet 42.

OPERATION

For the purpose of this description it will be assumed that the fluid is air. The air from a compressed air network passes through a borehole, which is a part of the inlet 1, into the regulator 100. The pressure of the network acts in the cylindrical space 3 on the one hand on the piston 9, which is sealed off from the feedback pressure space 10 by the O-ring 34, and, on the other hand, on the closure element 7 of the main valve body 5. Furthermore air (control air) flows through the borehole 32 to the control pre-pressure regulation. By this control pre-pressure regulation it is possible to pre-regulate to, for instance, ±0.2 bar the control pre-pressure required for controlling the regulator 100, despite variations in the pressure in the network. As to its operation, the network pressure also acts within the cylindrical space 30 on the one hand on the piston 29, which is sealed off from the space 28 (atmospheric pressure) by the O-ring 33, and on the other hand on the closure element 25 of the control pre-pressure valve body 24. The effective cross-sections of element 29 and 25 are of the same size so that the two forces produced by the network pressure thereon counteract each other. Equilibrium therefore always prevails, independently of the network pressure. The value of the control pre-pressure can be selected by means of the spring 27 depending on the desired maximum outlet pressure and minimum network pressure. By the pretension of the spring 27 the control pre-pressure valve body 24 opens and control air passes into the upstream valve space 44. The valve body 24 is in the open position only as long as the pressure corresponding to the spring initial tension prevails in the space 44. Equilibrium is reached when the product of the pressure in the space 44 (control pre-pressure) times the area of the control pre-pressure valve closure element 25 is equal to the spring initial tension. If now for instance the network pressure should increase, the valve body 24 regulates insofar as it moves in the closing direction (towards the right in FIG. 1) until the product of control pre-pressure times area of closure element 25 is again equal to the spring initial tension. The frictional force which is caused by the O-ring 33 causes control pressure variations. If no friction were present no control deviation would occur either. This friction enters twice into the calculation of the control deviation (opening and closing directions) in the following manner:

Valve-body diameter for instance d=12 mm
Frictional force $F_R=200$ p $$A = \frac{d^2 \cdot \pi}{4}$$ (Equation 1)

$$\Delta P = \frac{F_R}{A}$$

-continued $$P = \frac{2F_R}{\frac{d^2}{4}} = \frac{0.4 \text{ kp}}{\frac{(1.2)^2 \cdot \pi \text{cm}^2}{4}} - 0.35 \text{kgt/cm}^2 \approx \pm 0.2 \text{ bar}$$

wherein:
$F_R$ = the frictional force
d = the diameter of the control pre-pressure valve closure element 25
A = the area of the valve closure element 25
p = the pressure in the valve space 44.

With this control pre-pressure regulation it is therefore possible to accurately pre-regulate the control pre-pressure in case of network deviations, to about ±0.2 bar.

The control air now flows from the valve space 44 via the choke 23 into the actual control pressure space 22 and, if no current is flowing on the proportional magnet 42, through the valve-seat opening 43 and a downstream borehole 45 of the vent conduit 37 into the atmosphere. Therefore no control pressure is developed. Thus it is also clear why the control air from 44 to 22 passes through a choke 23 since, namely, this amount of air is lost (intrinsic consumption of air by the regulator 100). The intrinsic air consumption in the condition without current is therefore determined by the opening cross section of the choke 23 and the control pre-pressure set (spring pre-tension). If a current now flows at the magnet 42, a corresponding control pressure is built up in the control pressure space 22, said pressure being formed by means of the valve closure element 39, in the following manner. With every value of current a corresponding force $F_M$ acts on the armature rod 21. This force now acts on the valve closure element 39. The control pressure $P_{St}$ which is thus produced amounts to:

$$P_{St} \approx F_M$$ (Equation 2)

cross-section of the valve bore 43

The excess amount of control air is immediately removed again, as in the current-free condition, via the valve seat bore 43 and the outlet bore 45 of the vent conduit 37.

The small control pre-pressure variation of maximum ±0.2 bar can be regulated out precisely by the proportional magnet 42 down to an acceptable deviation (max. ±0.15 bar). If this control pre-pressure regulation were not present, the magnet could compensate for a network pressure variation of for instance 3 bars to at most ±0.1 bar. This deviation of the control pressure $P_{St}$ would result in an outlet pressure variation of about ±0.15 bar at the outlet 2, aside from the deviations of the regulator 100 itself. (See Equation 6 below.)

The control pressure which is built-up in this manner now acts on the diaphragm 11 which, by means of the ring 35, seals the control pressure space 22 off from the feed-back pressure space 10. The diaphragm 11, by means of the plate 12, converts the control pressure back into a force $F_D$ which then acts on the main valve body 5 via the pressure rod 13. By means of this conversion (force $F_M$ of, for instance, maximum 2.0 kgf on the armature bar 41 being converted into the control pressure $P_{St}$ of maximum 4.0 bars and the latter being converted into the force of maximum 72 kgf on the armature bar 13), any desired magnification of force can be obtained, since the diameter of the valve seat bore 43 and the diaphragm 11, which determine the magnification of the force, can be selected as desired. With the values assumed, an approximately 36× magnification of force is obtained with this regulator 100.

By the force $F_D$ on the pressure rod 13 the main valve body 5 is now displaced in the open direction against the spring 6 exerting a force in the close direction so that the air passage 3 becomes free. The air flows from the inlet 1 into the outlet 2 and then out of the regulator 100. In the outlet 2 the regulator outlet pressure or secondary pressure $P_A$ is built up. This outlet pressure is conducted through the fixed choke 17 into the feed-back pressure space and is exerted on the diaphragm 11. The stream of air passes further through the adjustable choke 19 and outlet borehole 46 of the vent conduit 18 into the open. Since everything takes place dynamically, these two chokes 17 and 19 form a so-called pressure divider. Over the two chokes 17 and 19 there takes place a given pressure drop depending on the size of their passage cross section. The advantage of the pressure divider circuit is that by means of the adjustable choke 19 the ratio of the passage cross sections of these two chokes 17 and 19 can be selected as desired and thus for a given pressure at the outlet 2, any desired feed-back pressure can be fixed in the feed-back pressure space 10.

The two extreme cases: If the passage cross section of the variable choke 19 has a value of zero then the pressure $P_R$ in the feed-back pressure space 10 is equal to the pressure $P_A$ in the outlet 2 (no pressure division): if the passage cross section of the adjustable choke 19 has its maximum value, then the pressure $P_R$ in the feed-back pressure space 10 goes towards zero (regulator 100 no longer acts as a regulator since the feed-back pressure is equal to zero for any outlet pressure).

The feed-back pressure $P_R$ is compared, as the actual value at the regulator outlet 2, with the control pressure $P_{St}$ at the diaphragm 11. The main valve body 5 is displaced in the opening direction until the resultant force on the main valve body 5 is equal to zero. The main valve body 5 then remains stationary and the outlet pressure in the outlet 2 remains constant.

FIG. 2 shows the different forces on the main valve body 5. Therein:

$A_M$ is the area of the diaphragm 11
$A_3$ is the area of the piston 9
$A_6$ is the effective area of the main-valve closure element 7 on which the outlet pressure works
$F_R$ is the frictional force of the O-ring 34 ($F_{R1}$ in the opening direction or $F_{R2}$ in the closing direction)
$F_F$ is the force of the closure spring 6
$F_{MV}$ is the force for deformation of the diaphragm 11
$P_A$ is the pressure in the outlet 2
$P_R$ is the pressure in the feed-back pressure space 10 and
$P_{St}$ is the pressure in the control pressure space 22.

The equilibrium equation for the movement of the main-valve body 5 in the opening direction is $$P_{St} \cdot A_M = P_{R1}(A_M - A_3) + P_{A1} \cdot A_6 + F_{F1} + F_R + F_{MV1} \quad \text{(Equation 3)}$$

If now, for intance, the pressure $P_E$ at the inlet 1 is increased, then the main valve body 5 moves in the closing direction since the pressure $P_A$ in the outlet 2 becomes too great and the resultant force on the main valve body is therefore other than zero. Main valve body 5 moves until equilibrium of forces prevails.

The equilibrium equations for the movement of the main valve body 5 in closing direction are:

$$P_{S2} \cdot A_M = P_{R2}(A_M - A_3) + P_{A2} \cdot A_6 \quad \text{(Equation 4)}$$
$$+ F_{F2} - F_R + F_{MV2}$$

$F_{F2} \leq F_{F1}$
$F_{MV2} \leq F_{MV1}$

It is naturally now of interest to know the control deviation $\Delta P_A$ of the outlet pressure, i.e. the difference $P_{A2} - P_{A1}$. For the calculation one proceeds from the following values, which correspond to the embodiment of FIG. 1, in which $A_3$ and $A_6$ are not equal:

$P_R \approx 0.69\ P_A$ \hfill (Equation 5)
$P_{R2} = 3.45\ kp/cm^2$
$\Delta P_{Stmax} = 0.03\ kp/cm^2$
$P_{St} = 4.0\ kp/cm^2$
$P_{A2} = 5.0\ kp/cm^2$
$F_R = 0.25\ kp$
$\Delta F_F \approx 0$
$\Delta F_{MV} \approx 0$
$F_{F2} = 4.5\ kp$
$A_M = 15.9\ cm^2$
$A_3 = 3.33\ cm^2$
$A_6 = 3.14\ cm^2$ This leads to the following equation for the control deviation:

$$\Delta P_A = \frac{\Delta P_{St} \cdot A_M + 2F_R + \Delta F_F + \Delta F_{MV}}{0.69\ (A_M - A_3) + A_6} \quad \text{(Equation 6)}$$

There results from this a maximum control deviation of $$\Delta P_{A\ max.} = 0.082\ kgt/cm^2 0.08 bar < \pm 1\% \text{ of } P_A \quad \text{(Equation 7)}$$

Whatever therefore the network pressure variation, the pressure set at the outlet 2 always remains within the limits of ±0.04 bar. Since now, however, in the case of most compressed-air compressors the switch hysteresis is set at 3 bars, the regulator 100 is so corrected internally that with a variation in inlet pressure of 3 bars the pressure at the outlet 2 approximately retains the value set.

The foregoing equations were derived with the assumption that $A_3$ and $A_6$ were unequal. In the embodiment of FIG. 2 this is not true. In this case Equation 6 becomes:

$$\Delta P_A = \frac{\Delta P_{St} \cdot A_M + 2FR + \Delta F_F + \Delta F_{MV} - \Delta P_E \cdot (A_3 - A_6)}{0.69 \cdot (A_M - A_3) + A_6} \quad \text{(Equation 8)}$$

With $\Delta P_E = 3$ bar (switch hysteresis of the compressor) we have:

$$P_A = 0.03\ bar \quad \text{(Equation 9)}.$$

Equations (3) and (4) show another great advantage of the pressure divider. The pressure divider makes it possible to obtain practically the same outlet pressure $P_A$ in the outlet 2 as the minimum pressure at the inlet 1 ($P_{E\ min.}$), for the reason that since with any control pressure ($P_{St} = P_{E\ min.}$) one can obtain any desired outlet pressure (maximum $P_{E\ min.}$). This is not possible without the pressure divider.

In the case of the regulator without a pressure divider, we should have $P_R = P_A$ and $P_{St\ max.} = P_{E\ min.}$. In this case, however, good regulation of the control pressure is impossible. These values, used in Equation (3), yield the results $P_{A\ max.} = 4.75$ bars when $P_{E\ min.} = 5$ bar. With an inlet pressure of 5 bars there can thus be obtained at the outlet 2 a maximum pressure of 4.75 bars, which cannot be regulated sufficiently accurately (the most precise regulation possible is within the limits ±0.25 bar).

The advantages of the pressure divider are that:

for any desired current at the proportional magnet 42, a selected outlet pressure can be adjusted in the outlet 2 by the adjustable choke 19;

all manufacturing tolerances (of chokes, spacings, etc.) and the deviations of the magnet characteristics (current-force) can be compensated for;

no pressure gauge is required at the outlet 2 since each given outlet pressure corresponds to a value of the current; and practically the same pressure is obtained at the regulator outlet 2 as is present at the inlet 1.

Figure 3:
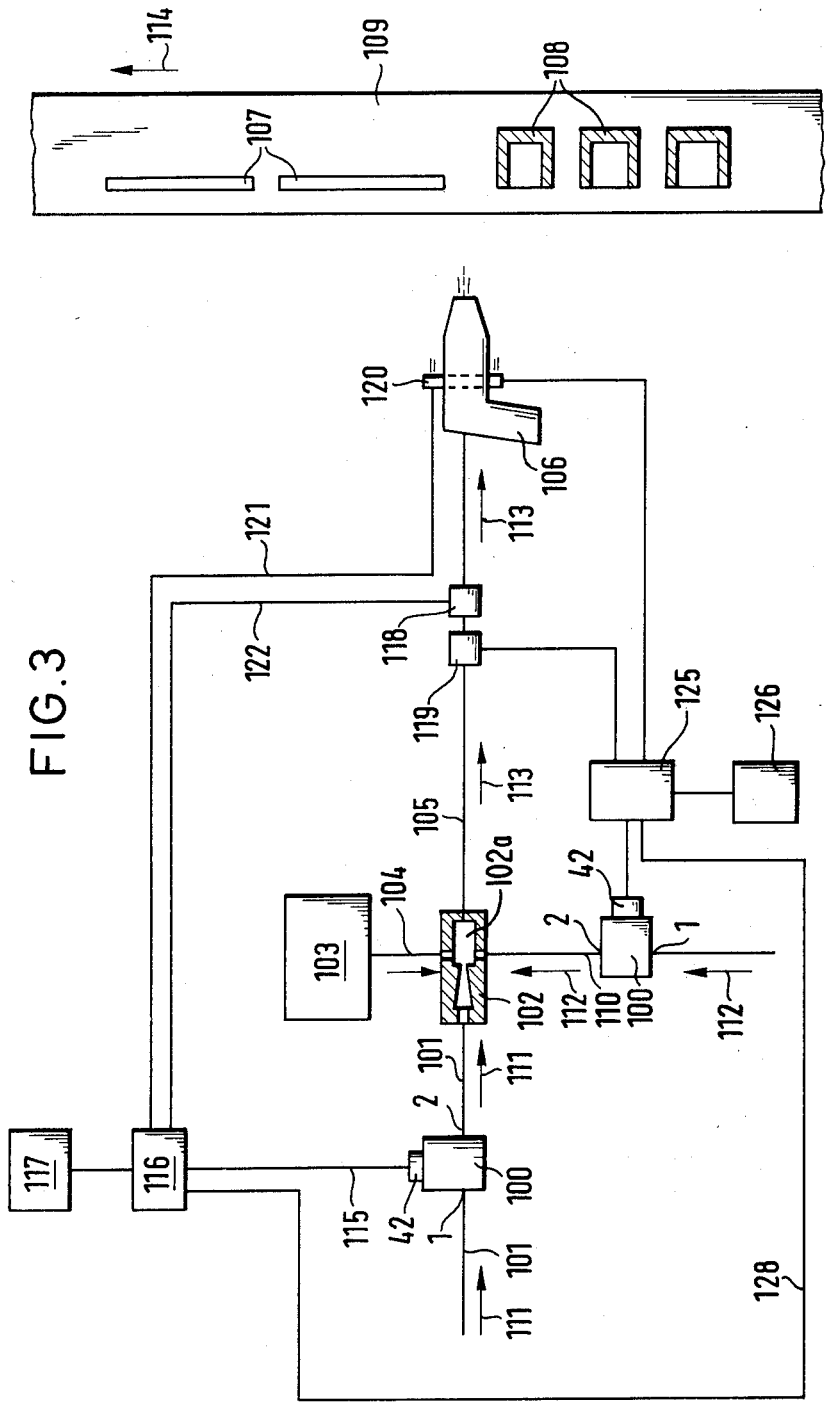

The pneumatic conveyor device in accordance with the invention, which is shown in FIG. 3, contains a plurality of regulating and program possiblities which can be used simulaneously or alternatively. A propellant gas line 101 discharges into a pneumatic conveyor apparatus 102. The stream of propellant gas, preferably air, draws a powdered to granular bulk material serving for the coating out of a storage container 103 via a conduit 104 and into the conveyor device 102 by the diffuser or Venturi principle and drives it via a conveyor conduit 105 to a spray device 106, for instance of spray-gun type, which atomizes the bulk material. The atomization jet of the spray device 106 is directed against articles 107 and 108 which for this coating process are moved by a transport device 109 past the spray nozzle of the spray device 106.

In the same manner as the bulk-material conduit 105, a control gas conduit 110 also discharges into the region of maximum vacuum 102a of the pneumatic conveyor device 102. The quantity of the bulk material drawn in via the conduit 104 depends on the vacuum prevailing in that vacuum region 102a. By feeding a given amount of control gas via the conduit 110 the vacuum can be varied and the amount of bulk material drawn in thus also regulated. Air is preferably employed as the control gas. Normally the propellant gas is fed with constant pressure via the conduit 101, the rate of flow of control gas is changed corresponding to each desired change in the conveyance output. Depending on the specific use, however, a given change of the stream of propellant gas may also be desired. The direction of flow of the propellant gas is indicated by arrows 111, the direction of flow of the control gas by arrows 112, the direction of flow of the mixture of gas and bulk material by arrows 113, and the direction of movement of the transport device 109 with the articles 107 and 108 by an arrow 114.

For adjusting and maintaining a given pressure, a pressure regulator 100 of the above described type is present in the propellant gas conduit 101. A comparison and switching device 116 is connnected to the electromagnet 42 of the pressure regulator 100 via an electric line 115. Via this comparison and switching device 116, given electric desired-value signals can be fed in a given time sequence from a program transmitter 117 to the electromagnet 42.

A measurement device 118 is contained in the conveyor conduit 105 for the mixture of velocity of bulk material and gas, for instance in order to measure the pressure of the mixture, while a device 119 is contained therein in order for instance, to measure the proportion of solids contained in the mixture. Furthermore, close to the outlet nozzle of the spray device 106 there is an article detection device 120 which, depending on whether an article to be coated is present in front of the nozzle, gives off signals via a line 121 to the comparison and switching device 116. In the same way, the measurement device 118 of the conveyor conduit 105 gives signals dependent on the measurement value to the comparison switching device 116 via a line 122. In this way it is possible to feed to the electromagnet 42 of the pressure regulator 100 arranged in the propellant-gas conduit 101, either simultaneously or alternately control or regulating signals from the program transmitter 117 and/or from the article detection device 120 or, in the form of a closed control circuit, from the measurement device 118.

At the same time it is possible also to have a pressure regulator 100 in the control gas conduit 110, the electromagnet 42 of which regulator 100 can be controlled, via a comparison and switching device 125, simultaneously or alternately by a program transmitter 126, the measurement device 119 of the conveyor conduit 105 and/or the article-detection device 120.

It is also possible to connect the two comparison and switching devices 116 and 125 to each other via a line 128 so that the stream of propellant gas of the conduit 101 and the stream of control gas of the conduit 110 can be adapted to each other.

It is clear that by the precisely operating pressure regulator 100 which substantially avoids deviations in control the pneumatic conveying of powdered to granular bulk material and particularly the spray coating of article can be made substantially automatic. By the possibilities of calibration afforded with the pressure divider of the pressure regulators 100, pressure gauges and expensive manual adjustment processes are dispensed with. Since the pressure regulators 100 also act as on-off valves, no additional shut-off valves are required.

In the spaces between the individual articles 107 and 108 the conveyance of bulk material can be interrupted. This can be done by shutting off the stream of propellant gas of conduit 101 or by an increased feeding of control gas through control gas conduit 110 into the vacuum region 102a, in which case also no bulk material is conveyed. In this way bulk material is saved; at the least, less excess bulk material has to be drawn off by strong vacuum sources, cleaned, and returned to the storage container 103. Furthermore, articles which require coatings of different thickness in different places can be sprayed with different thickness in the required manner, pre-programmed by the program transmitters 117 and/or 126. It is also possible to coat a sequence of different articles one after the other without interruption by providing the program transmitters 117 and/or 126 with a corresponding program. For example, the flat articles 107 may require only slight coating and the articles 108 a thicker coating. Furthermore, it is normally necessary for a stronger spray jet to be directed into cavities such as those which the articles 108 have in order for the cavities to be sufficiently coated.

The measurement device 118 could also be connected to the comparison and switching device 125, and the measurement device 119 can be connected to the comparison and switching device 116.

The propellant gas line 101 and the control gas line 110 can be supplied with the same gas and from the same gas network. If, on the other hand, a different source of gas is used for each of the conduits 101 and 110, different types of gas can also be used.

We claim:

1. A pneumatic conveyor system with adjustable capacity for conveying a powdered to granular bulk material, comprising:

a pneumatic conveyor apparatus for drawing a powdered to granular bulk material from a source thereof and mixing it with a propellant gas;

propellant gas conduit means for feeding the propellant gas to said pneumatic conveyor apparatus;

second conduit means for delivering the mixture of the gas and the bulk material to a spray device for spray-coating an object;

a first pressure regulator cooperating pneumatically with said pneumatic conveyor apparatus to control the rate at which the mixture is delivered for spraying, by controlling the rate at which one of the components of the mixture is supplied to said pneumatic conveyor apparatus for mixing, wherein said first pressure regulator comprises:

an inlet for a propellant gas;

an outlet for the propellant gas;

a main valve for controlling the flow of the propellant gas from said inlet to said outlet; said main valve having a main valve body;

means defining a control pressure space for urging said main valve open by means of exerting pressure on said main valve body, said control pressure space communicating with said inlet via a pre-regulation conduit; said means defining said control pressure space including pressure comparison means having two opposite sides, one of said opposite sides being exposed to the pressure in said control pressure space and the other of said opposite sides being exposed to a second pressure for comparing the second pressure to the pressure in said control pressure space;

a control valve for controlling pressure in said control pressure space, said control pressure space communicating via said control valve with a first vent;

pressure control means including said first control means for urging said control valve closed, to control the pressure in said control pressure space;

means defining a feedback pressure space for urging said main valve closed by means of exerting a force on said other of said two opposite sides of said pressure comparison means, the pressure in said feedback pressure space being the second pressure exerted on said pressure comparison means; said feedback pressure space communicating with said outlet and with a second vent.

2. The system of claim 1, wherein said pneumatic conveyor apparatus comprises a diffuser having a vacuum region for applying suction to draw the bulk material from the source thereof; and said system further comprising vacuum control means for feeding a control gas into said vacuum region for controlling the degree of vacuum therein, thereby to control the rate at which the mixture is delivered for spraying, said pressure regulator being disposed in said vacuum control means for maintaining the gas pressure therein at a desired value.

3. The system of claim 2, wherein said pressure regulator has first control means for controlling said first pressure regulator responsive to the desired value to be attained; and further comprising remote control means for remotely controlling said first control means for adjusting the desired value.

4. The system of claim 2, further comprising a second pressure regulator disposed in said propellant gas conduit means for controlling the rate at which said propellant gas is supplied to said pneumatic conveyor apparatus.

5. The system of claim 4, wherein said pressure regulators are substantially identical.

6. The system of claim 1, further comprising remote control means for remotely controlling said pressure control means for adjusting the desired value, said remote control means comprising a program transmitter for remotely controlling the desired value according to a predetermined program.

7. The system of claim 6, wherein said pressure control means comprises a first electromagnet and said remote control means is for generating electrical signals and applying said signals to said first electromagnet for adjusting the desired value.

8. The system of claim 7, wherein said program transmitter is for generating electrical signals and applying them to said first electromagnet for adjusting the desired value according to a predetermined program.

9. The system of claim 8, wherein said program transmitter comprises means for generating successive electrical signals of different magnitudes for application to said first electromagnet.

10. The system of either of claim 8 or claim 9, wherein said program transmitter means comprises for generating a succession of electrical signals of different durations for application to said electromagnet means.

11. The system of claim 6, further comprising means in said second conduit means for measuring a parameter of the flow of the mixture of gas and bulk material, and for feeding signals representative of the instantaneous value of said parameter to said first control means to control the desired value responsive thereto.

12. The system of claim 11, wherein said parameter is flow velocity.

13. The system of claim 11, wherein said parameter is the bulk material/gas ratio.

14. The system of claim 1, further comprising means for feeding signals to said pressure control means to indicate the presence or absence of an object at a location at which an object can be spray-coated, for operating said first pressure regulator for terminating spraying when no object is present at said location.

15. The system of claim 1, wherein said pressure regulator further comprises a spring urging said main valve closed.

16. The system of claim 1, wherein said pressure regulator further comprises rod means disposed in said feedback pressure space and in mechanical contact with both said pressure comparison means and said main valve body, for urging said main valve closed with a force proportional to the difference between the pressure in said control pressure space and the pressure in said feedback pressure space.

17. The system of claim 16, further comprising means for exposing a cross-sectional area of said control valve body to the fluid pressure in said control pressure space that is smaller than the area of said one side of said pressure comparison means that is exposed to the fluid pressure in said control pressure space.

18. The system of claim 1, wherein said pressure regulator further comprises a cylindrical volume communicating with said inlet and with said feedback pressure space, and wherein said main valve body includes a piston accommodated in said cylindrical volume and a main valve closure element, said piston and said main valve closure element each having a respective cross-sectional area exposed to the pressure in said inlet; said exposed cross-sectional area of said piston being greater than said exposed cross-sectional area of said main valve seat closure element.

19. The system of claim 1, wherein said pressure regulator further comprises pre-regulation means for pre-regulating the fluid pressure in said control pressure space, said pre-regulation means being provided in said pre-regulation conduit between said inlet and said control pressure space.

20. The system of claim 19, wherein said pre-regulation means comprises a pre-regulation valve that is urgeable closed by the fluid pressure in the portion of said pre-regulation conduit between said pre-regulation valve and said control pressure space and that is urgeable open by the fluid pressure in said inlet; said pre-regulation valve further comprising a pre-regulation spring for urging said pre-regulating valve open.

21. The system of claim 20, wherein said first pressure regulator further comprises a first choke disposed in said pre-regulation conduit between said pre-regulation valve and said control pressure space for limiting flow between said pre-regulation valve and said control pressure space.

22. The system of claim 1, wherein said pressure control means comprises a electromagnet, which is a proportional magnet.

23. The system of claim 1, wherein said pressure regulator further comprises a first choke disposed in said pre-regulation conduct for limiting flow therein.

24. The system of claim 1, wherein said pressure regulator further comprises a second choke between and communicating with said feedback pressure space and said outlet for limiting flow therebetween.

25. The system of claim 24, wherein said pressure regulator further comprises an adjustable choke between and communicating with said feedback pressure space and said second vent for limiting flow therebetween.

26. The system of claim 1, wherein said pressure comparison means is a flexible diaphragm.

27. The system of claim 1, wherein said pressure regulator is disposed in said propellant gas conduit means for controlling the rate at which said propellant gas is supplied to said pneumatic conveyor apparatus.

* * * * *

UNITED STATES PATENT AND TRADEMARK OFFICE
CERTIFICATE OF CORRECTION

PATENT NO. : 4,284,032
DATED : August 18, 1981
INVENTOR(S) : Moos et al.

It is certified that error appears in the above-identified patent and that said Letters Patent are hereby corrected as shown below:

On cover page, at [75], line 2, as to the inventors' addresses and citizenship, change "Gall, both of Sweden" to -- Gallen, both of Switzerland --.

Signed and Sealed this

Second Day of February 1982

[SEAL]

Attest:

Attesting Officer

GERALD J. MOSSINGHOFF

Commissioner of Patents and Trademarks